United States Patent [19]

Payer et al.

[11] Patent Number: 5,393,473
[45] Date of Patent: Feb. 28, 1995

[54] PROCESS FOR PELLETING ULTRA-HIGH MOLECULAR WEIGHT POLYETHYLENE

[75] Inventors: Wolfgang Payer, Wesel; Maher Onallan, Oberhausen; Winfried Materne, Wetter; Andreas Sobbe, Dinslaken, all of Germany

[73] Assignee: Hoechst Aktiengesellschaft, Germany

[21] Appl. No.: 39,939

[22] Filed: Mar. 29, 1993

[30] Foreign Application Priority Data

Mar. 30, 1992 [DE] Germany ............................ 4210351

[51] Int. Cl.⁶ .................... B29B 9/00; B29C 67/02
[52] U.S. Cl. ..................................... 264/117; 264/118; 264/140; 264/142; 425/202; 425/DIG. 230
[58] Field of Search ............... 264/117, 118, 122, 120, 264/210.4, 210.6, 140, 141, 142, 143, 322, 319; 425/DIG. 230, 202

[56] References Cited

U.S. PATENT DOCUMENTS

| | | | |
|---|---|---|---|
| 2,124,744 | 7/1938 | Meakin | 425/DIG. 230 |
| 2,432,326 | 12/1947 | Meakin | 425/DIG. 230 |
| 4,110,391 | 8/1978 | Berzen et al. | 264/319 |
| 4,111,632 | 9/1978 | Leaver | 425/DIG. 230 |
| 4,455,273 | 6/1984 | Harpell et al. | 264/257 |
| 4,545,950 | 10/1985 | Motooka et al. | 264/210.6 |
| 4,587,163 | 5/1986 | Zachariades | 264/322 |
| 4,770,625 | 9/1988 | Appelgren et al. | 425/DIG. 230 |
| 4,820,466 | 4/1989 | Zachariades | 264/120 |
| 4,877,813 | 10/1989 | Jinno et al. | 264/148 |
| 4,923,649 | 5/1990 | Hsieh et al. | 264/117 |
| 4,950,151 | 8/1990 | Zachariades | 264/120 |
| 4,996,011 | 2/1991 | Sano et al. | 264/120 |
| 5,002,714 | 3/1991 | Sano et al. | 264/120 |
| 5,091,133 | 2/1992 | Kobayashi et al. | 264/120 |

*Primary Examiner*—Jay H. Woo
*Assistant Examiner*—Duane S. Smith
*Attorney, Agent, or Firm*—Bierman and Muserlian

[57] ABSTRACT

Pulverulent ultra-high molecular weight polyethylene, alone or as a mixture with other polyethylenes, is compacted into extrudates by extrusion agglomeration under pressure at temperatures of 100° to 150° C. over average residence times in the die of 2 to 40 seconds and at a compression ratio of 1:5 to 1:15, and the extrudates are divided into pellets.

5 Claims, 1 Drawing Sheet

PROCESS FOR PELLETING ULTRA-HIGH MOLECULAR WEIGHT POLYETHYLENE

BACKGROUND OF THE INVENTION

Linear polyethylenes having an average molecular weight of more than 500,000 g/mol, particularly at least $2.5 \times 10^6$ g/mol to $10^7$ g/mol, are called ultra-high molecular weight polyethylenes (UHMW-PE). The molecular weights are understood as meaning the values determined by viscometry and a method for their measurement is described, for example, in CZ-Chemietechnik, Vol 4 (1974), page 129 et seq. Various processes are known for the preparation of UHMW-PE and a proven process which operates under low pressure using mixed catalysts of Ti(III) halides and organo-aluminum compounds is described in DE-B No. 2,361,508.

UHMW-PE is distinguished by a number of industrially important properties, namely high impact strength which still shows good values even at low temperatures should be emphasized. Even the severest exposure to impact does not lead to fracture. It is resistant to stress corrosion and is also dimensionally stable and tear-resistant at elevated temperatures. The high abrasion resistance of UHMW-PE, its low coefficient of friction compared with other materials and its excellent resistance to aggressive media furthermore are remarkable.

On the basis of this profile of properties, UHMW-PE has found acceptance as a special material in many branches of industry such as the use of UHMW-PE for the production of weaving loom pickers and similar components in the textile industry which are subjected to high stresses, as a material for rollers, valves, slides, strippers and guide strips in machine construction, and for lining bunkers, coke chutes and conveyor troughs in mining. It is employed in filtration for manufacture of filter elements, in the packaging industry for the production of conveyor stars and guide and deflection rollers for bottling machines, and in electrical engineering for production of insulating components in the high and ultra-high frequency sector.

In contrast to low molecular weight grades of polyethylene which are mainly supplied in the form of granules by producers, UHMW-PE is sold as powder which is unfavorable for transportation, distribution, storage and processing. Ultra-high molecular weight polyethylene is supplied as a powder due to its thermal properties. On heating, UHMW-PE does not melt, but merely passes into a viscoelastic state in which the individual polymer particles soften but still retain their shape even at 200° C. They combine with one another to give larger particles which are only loosely joined together and which easily fall apart again.

OBJECTS OF THE INVENTION

It is an object of the invention to provide a process for pelletizing ultra-high weight polyethylene which gives stable agglomerates and moreover does not damage the material employed either by the mechanical treatment—for example by the shear forces which arise—or by the exposure to heat.

It is another object of the invention to provide the novel pellets of ultra-high molecular weight polyethylene produced by the process.

These and other objects and advantages of the invention will become obvious from the following detailed description.

SUMMARY OF THE INVENTION

The process of the invention for pelletizing ultra-high molecular weight polyethylene, alone or as a mixture with other polyethylenes, comprises compacting the pulverulent material by extrusion agglomeration under pressure at temperatures of 100° to 150° C. over average residence times in the die of 2 to 40 seconds and at a compression ratio of 1:5 to 1:15, and dividing the product extrudates emerging from the die into pellets of the desired length. The process allows UHMW-PE to be converted gently, i.e. without impairment of its characteristic properties by degradation of the macromolecules, into high-strength pellets.

Extrusion agglomeration is understood as meaning compacting of pulverulent material in an open compression channel (die) in a pan under the action of rotating rollers. During this procedure, powder fed to the die forms on the pan, a layer of material which is rolled and acted on by the rollers. Under their action, the powder is first precompacted, then transported, and, under the pressure which increases during rolling, is pushed into the compression channels of the pan. In the channels, constant repetition of the compaction and transportation operation causes agglomerates to build up into a continuous extrudate from individual disks which are joined together. The pressure exerted by the rollers must of course be greater than the opposing force generated by friction of the bodies formed in the compression channel. An extrudate emerges on the underside of the pan and is divided into cylinders of the desired length using blades.

It has been found that the decisive factors for the structure and strength of the extrudate in the compression channel of the pan are the pressure exerted on the powder which reduces the distance between the individual particles, the heating of the powder due to friction during transportation, compaction and compression, and the period during which the elevated temperatures acts on the compressed material. Elevated temperatures under increased pressures means that the particles stick to one another, and the duration of the pressure/heat treatment is decisive for the strength of the polymer extrudate and of the pellets.

It has been found that shaped articles of high stability which do not disintegrate or undergo intolerable abrasion either during transportation or during storage are obtained by maintaining certain temperature ranges over a certain period of time during compression of pulverulent PE-UHMW.

According to the invention, the extrusion agglomeration is carried out under pressure at temperatures of 100° to 150° C. and temperatures of 110° to 130° C. have proved to be particularly appropriate. The operating temperature is preferably established not by supplying heat from outside but by the heat of friction intrinsic to the system which is a consequence of the movement of the rollers and of the compression operation in the channels of the pan. The average residence time in the die under the temperatures mentioned is 2 to 40 seconds, and preferably 5 to 10 seconds.

As a third parameter, the compression ratio characterizes the novel procedure and this is a measure of the compaction of the pulverulent material, and is the ratio of the diameter to the length of the compression channel. According to the invention, it is 1:5 to 1:15, preferably 1:8 to 1:12.

DESCRIPTION OF THE PREFERRED EMBODIMENTS

Figure 1:
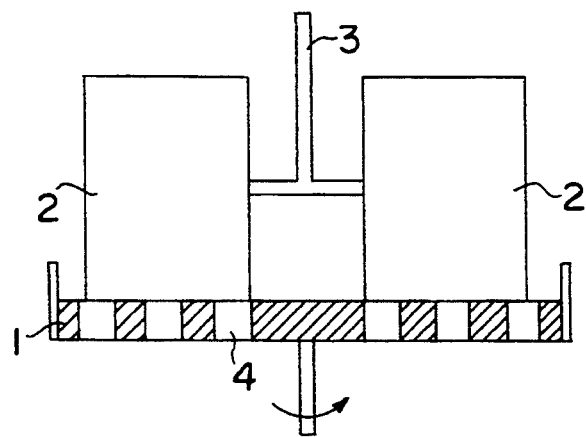
FIG. 1 is a cross section view of one embodiment of an extrusion press used in the process of the invention.

Pelleting presses in which the rollers rotate on a horizontal, circular flat plan (plate pan) are employed for carrying out the novel process. Various embodiments of the apparatus are possible here: fixed flat pan with rotating roller head, rotating flat pan with rotating roller head or rotating flat pan with fixed roller head and driven rollers. The pan comprises a circular disk provided with a perforated field, i.e. the compression channels over which the rollers roll.

Among other things, the shape of the compression channels determine the temperature which arises during compaction and the residence time of the compressed material in the compression channel. At a given extrudate cross-section which is essentially determined by the desired size of the pellets, the shape is specified by the length and geometry of the channel. In principle, it is possible to provide compression channels which are cylindrical in shape over their entire length. Channels formed in this manner allow, at a given diameter, the temperature and residence time to be established only over the length of the channels. This impairs the adaptability of the process to varying conditions.

According to a preferred embodiment of the invention, the pan is therefore provided with channels which initially narrow from the channel entry in the direction of the channel exit, i.e. decrease in diameter, and finally end in a cylindrical outlet, the diameter of which corresponds to the exit outlet, the diameter of the conical part. The cylindrical part of the compression channel preferably has a diameter of 0.5 to 15 mm, and in particular 1.5 to 10 mm. The friction in the channel and therefore the temperatures which arise in the compressed material can be influenced and adjusted by varying the initial and final diameter of the conical part of the compression channel and by changing the ratio of the length of the conical and cylindrical part of the compression channel.

The residence time of the pulverulent polymer, i.e. the duration of the heat treatment in the bores of the pan, can likewise be controlled in this manner. To facilitate intake of the polyethylene powder and to make it uniform, the compression channels can be provided with an entry cone. The compression ratio in such compression channels, which deviate from the cylindrical shape, is obtained from the smallest diameter and the length of the imaginary cylinder of the same volume.

The object of the rotating rollers is to compact the layer of material lying on the pan and to push it into the compression channels. Flat pan presses are usually fitted with 2 to 6 rollers which exert a pressure on the pulverulent polymer, the magnitude of which is adjusted via the torque of the roller head. In the case of flat pan presses, the roller head is understood as meaning the central section on which the rollers are mounted via axles.

So that the pressure of the rollers on the polymer powder has its full effect, the distance between it and the pan is set as small as possible. In this connection, it has also proved appropriate to design the perforated field of the pan narrower than the width of the rollers, to take into account the pressure of the rollers on the polymer powder decreasing from the inside outwards. If the width of the perforated field and rollers is the same, the residence time of the pulverulent material in the compression channels passed over by the edge zones of the rollers is longer than that in the central regions, with the risk that the polymer will be degraded by heat, and possibly also starts to plasticize, and metal particles formed by the abrasion become concentrated.

Moreover, it is advisable to avoid direct contact between the rollers and the pan so that abrasion of metal is largely suppressed and damage to the pan is prevented. For this purpose, it has proved appropriate to limit the perforated field by grooves. It is furthermore additionally advantageous to bevel the edges of the rollers so that in the inclined position, they do not touch the pan. This also prevents the polymer powder from being entrained by the outer region of the rollers and subjected to excess stress because of the lack of compression channels.

Various grades of ultra-high molecular weight polyethylenes and also mixtures of ultra-high molecular weight polyethylene with other polyethylenes can be processed to pellets by the process of the invention Possible mixing components are polyethylenes having a molecular weight of about 10,000 to about 500,000 g/mol, their content in these mixtures being up to about 40% by weight. The polymer or polymer mixture moreover can comprise customary additives which include the customary processing auxiliaries and stabilizers such as antistatics, anticorrosion agents, light and heat stabilizers, as well as pigments and additives which impart particular properties to the polyethylene such as metal powders to increase the thermal conductivity, boron or boron compounds to improve neutron absorption, or glass beads to increase the resistance to deformation.

In the following examples, there are described several preferred embodiments to illustrate the invention. However, it should be understood that the invention is not intended to be limited to the specific embodiments.

EXAMPLE 1

Figure 2:
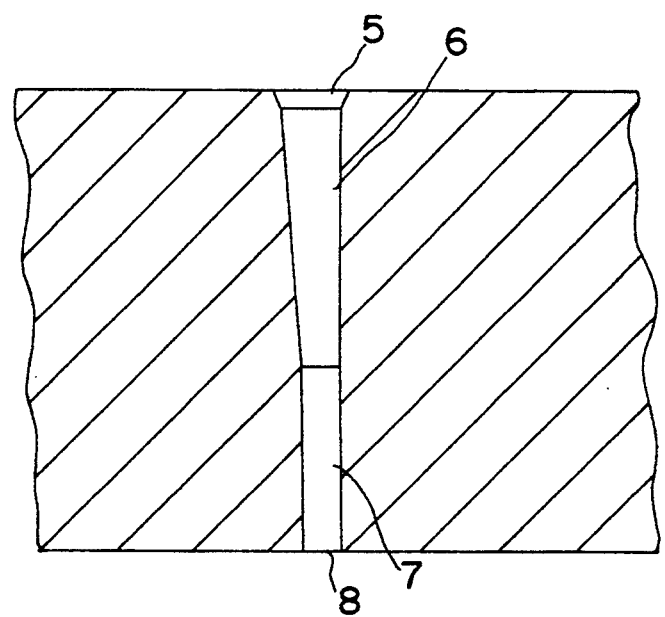
FIG. 2 is a view of a compression channel used in FIG. 1

The agglomeration of pulverulent UHMW-PE was carried out in a press shown in cross-section in FIG. 1 wherein 1 is the pan, 2 the rollers, 3 the roller head and 4 the compression channels. The design of a compression channel is shown in FIG. 2. The pulverulent, pre-compressed material was passed through the entry cone 5 and entered the conical part 6 of the compression channel, which then became the cylindrical part 7. The extrudate left the compression channel at the exit 8 and was divided into cylindrical pellets by a blade which is not shown.

60 kg per hour of pulverulent UHMW-PE were compressed in an apparatus of the type described above with a rotating pan and fixed roller head. The pan had a thickness of 30 mm and rotated at a speed of 80 minute$^{-1}$. The roller head was equipped with two rollers which were operated at a speed of 100 to 105 minute$^{-1}$. The compression channels had a conical shape with an angle of inclination of about 1.4° over a length of 18 mm, and then became a cylinder, the diameter of which corresponded to the final diameter of the cone.

The properties of powder and pellets were compared with one another in Table 1. The values in this and in further experiments were determined in accordance with the following specification:

| | |
|---|---|
| Flow value | DIN 53493 |
| Viscosity number | DIN 53728 Sheet |
| Bulk density | DIN 53468 |
| Density of the homogeneously compressed material | DIN 53479 |
| Notched impact strength | DIN 53453 (but with a V-notch 15° sharp on both sides) |
| Grain hardness | the force required to crush a pellet perpendicularly to the longitudinal axis was measured; the values stated were mean values of 50 individual measurements |
| Abrasion | 30 g of pellets were stirred in a rotating drum with a diameter of 290 mm for 60 minutes at a speed of 25 min$^{-1}$; the abrasion was determined with the aid of a 1 mm sieve. |

TABLE 1

| | Powder | Pellets |
|---|---|---|
| Flow value (N/mm$^2$) | 0.15 | 0.15 |
| Viscosity number (ml/g) | 1990 | 1990 |
| Bulk density (g/cm$^3$) | 0.46 | 0.54 |
| Density of the homogeneously compressed material (g/cm$^3$) | 0.933 | 0.935 |
| Notched impact strength (mJ/mm$^2$) | 182 | 175 |
| Length (mm) | — | 5.5 |
| Diameter (mm) | — | 2.7 |
| Grain hardness (N) | — | 98 |
| Abrasion (%) | — | 0.5 |

An unchanged flow value and unchanged viscosity number showed that the polymer was not degraded by the compression operation.

EXAMPLE 2

60 kg per hour of green-colored pulverulent UHMW-PE (flow value of the powder: 0.25 N/mm$^2$) were compressed in the apparatus of Experiment 1 under the same conditions. The properties of the resulting pellets are summarized in Table 2.

TABLE 2

| | Pellets |
|---|---|
| Flow value (N/mm$^2$) | 0.16 |
| Viscosity number (ml/g) | 2100 |
| Bulk density (g/cm$^3$) | 0.52 |
| Notched impact strength (mJ/mm$^2$) | 174 |
| Length (mm) | 5.4 |
| Diameter (mm) | 2.7 |
| Grain hardness (N) | 62 |
| Abrasion (%) | 2.7 |

EXAMPLE 3

60 kg per hour of pulverulent UHMW-PE into which 5% by weight of carbon black were incorporated, were compressed in the apparatus of Experiment 1 under the same conditions. The properties of the resulting pellets are summarized in Table 3.

TABLE 3

| | Pellets |
|---|---|
| Flow value (N/mm$^2$) | 0.16 |
| Bulk density (g/cm$^3$) | 0.44 |
| Density of the homogeneously compressed material (g/cm$^3$) | 0.935 |
| Length (mm) | 6.1 |
| Diameter (mm) | 2.7 |

TABLE 3-continued

| | Pellets |
|---|---|
| Grain hardness (N) | >200 |
| Abrasion (%) | 0.3 |

EXAMPLE 4

6.2 kg per hour of UHMW-PE were processed in a laboratory press with a fixed flat pan and a rotating roller head. The pan had a thickness of 18 mm and rotated at a speed of 84 minute$^{-1}$. The compression channels had a conical shape with an angle of inclination of about 1.4° over a length of 16 mm; they then became a cylinder, the diameter of which corresponds to the end diameter of the cone. The properties of the resulting pellets are summarized in Table 4.

TABLE 4

| | Powder | Pellets |
|---|---|---|
| Flow value (N/mm$^2$) | 0.18 | 0.15 |
| Viscosity number (ml/g) | 1930 | 1890 |
| Density of the homogeneously compressed material (g/cm$^3$) | 0.935 | 0.935 |
| Notched impact strength (mJ/mm$^2$) | 175 | 192 |
| Length (mm) | — | 5.4 |
| Diameter (mm) | — | 2.7 |
| Grain hardness (N) | — | 80 |
| Abrasion (%) | — | 0.9 |

EXAMPLE 5

Green-colored pulverulent UHMW-PE was compressed in an apparatus corresponding to Example 4. 12 kg per hour of powder were processed at a roller head speed of 105 minute$^{-1}$. The pan had a thickness of 18 mm, and the pressing channels had a conical shape with an angle of inclination of about 1.4° over a length of 17 mm. The resulting pellets were 8 mm long and had a diameter of 2.8 mm; their grain hardness was 71N and their abrasion 5%.

EXAMPLE 6

Pulverulent UHMW-PE into which 5% by weight of carbon black were incorporated were compressed in an apparatus corresponding to Example 4. 6.1 kg per hour of powder were processed at a roller head speed o 87.5 minute$^{-1}$. The pan had a thickness of 17.5 mm, and the compression channels had conical shape with angle of inclination of about 1.4° over a length of 16 mm. The resulting pellets were 9.5 mm long and had a diameter of 3 mm; their grain hardness was more than 20N and their abrasion 0.2%.

EXAMPLE 7

Pulverulent UHMW-PE into which 20% by weight of aluminum graphite were incorporated to increase the thermal conductivity was compressed in an apparatus corresponding to Example 4. The speed of rotation of the roller head was 109 minute$^{-1}$, and the throughput was 9.3 kg of powder/hour. The resulting pellets were 7.1 mm long and had a diameter of 2.8 mm; their grain hardness was more than 200N and their abrasion 0.5%.

Various modifications of the product and process of the invention may be made without departing from the spirit or scope thereof and it is to be understood that the invention is intended to be limited only as defined in the appended claims.

What we claim is:

1. A process for pelletizing ultra-high molecular weight polyethylene comprising the steps of compacting a pulverulent material selected from the group consisting of ultra-high molecular weight polyethylene and mixtures thereof with other lower molecular weight polyethylenes by extrusion agglomeration in a die under pressure at temperatures of 100° to 150° C. over average residence times in the die of 2 to 40 seconds and at a compression ratio of 1:5 to 115 to obtain product extrudates, and dividing the product extrudates emerging from the die into pellets of the desired length.

2. The process of claim 1 wherein the extrusion agglomeration takes place at temperatures of 110° to 130° C.

3. The process of claim 1 wherein the residence time in the die is 5 to 10 seconds.

4. The process of claim 1 wherein the compression ratio is 1:8 to 1:12.

5. The process of claim 1 wherein the compression channel initially narrows in the direction of the channel exit, and then ends in a cylindrical outlet whereby the friction in the channel may be adjusted by varying the diameter of the compression channel and the ratio of the conical and cylindrical parts.

* * * * *